Elliott

[54] FOCUSING SYSTEM FOR VIDEODISC PLAYER

[75] Inventor: James E. Elliott, San Pedro, Calif.

[73] Assignee: MCA Disco-Vision, Inc., Universal City, Calif.

[22] Filed: Mar. 25, 1974

[21] Appl. No.: 454,130

[52] U.S. Cl. .................. 178/6.6 DD; 179/100.3 V; 250/201

[51] Int. Cl.² .......................................... H04N 5/76

[58] Field of Search ........................ 250/201–204, 250/234; 340/173 LM; 179/100.3 V, 100.3 G, 100.3 R, 100.4 R, 100.4 M, 100.41 L; 178/6.7 A, DIG. 29, 6.6 R; 350/41, 46, 76, 77; 352/140, 103, 26; 353/101; 355/55–57, 60; 356/4, 5, 122; 95/44 R, 44 C, 45

[56] References Cited
UNITED STATES PATENTS

| | | | |
|---|---|---|---|
| 3,532,045 | 10/1970 | Genahr | 95/45 |
| 3,596,101 | 7/1971 | Someya | 250/204 |
| 3,673,412 | 6/1972 | Olson | 179/100.3 V |
| 3,757,124 | 9/1973 | Kaestner | 250/201 |
| 3,833,769 | 9/1974 | Compaan et al. | 179/100.3 V |
| 3,876,841 | 4/1975 | Krammer et al. | 179/100.3 V |

OTHER PUBLICATIONS

IBM Technical Disc. Bulletin, Frosch et al., vol. 15, No. 2, 7/72, pp. 504–505.

*Primary Examiner*—Raymond F. Cardillo, Jr.

[57] ABSTRACT

A focus detector includes apertured photodetectors which intercept a radiant beam. Changes in focus differentially affect the amount of radiation impinging on the detectors resulting in corresponding changes in their signal output.

A videodisc system employing the detector moves a focusing lens to compensate for variations in the position of a target videodisc, so that a scanning beam is always accurately transmitted to a detector. A difference circuit connected to two photodetectors generates a driving signal to energize a lens-moving motor for shifting the focusing lens toward or away from the videodisc.

15 Claims, 7 Drawing Figures

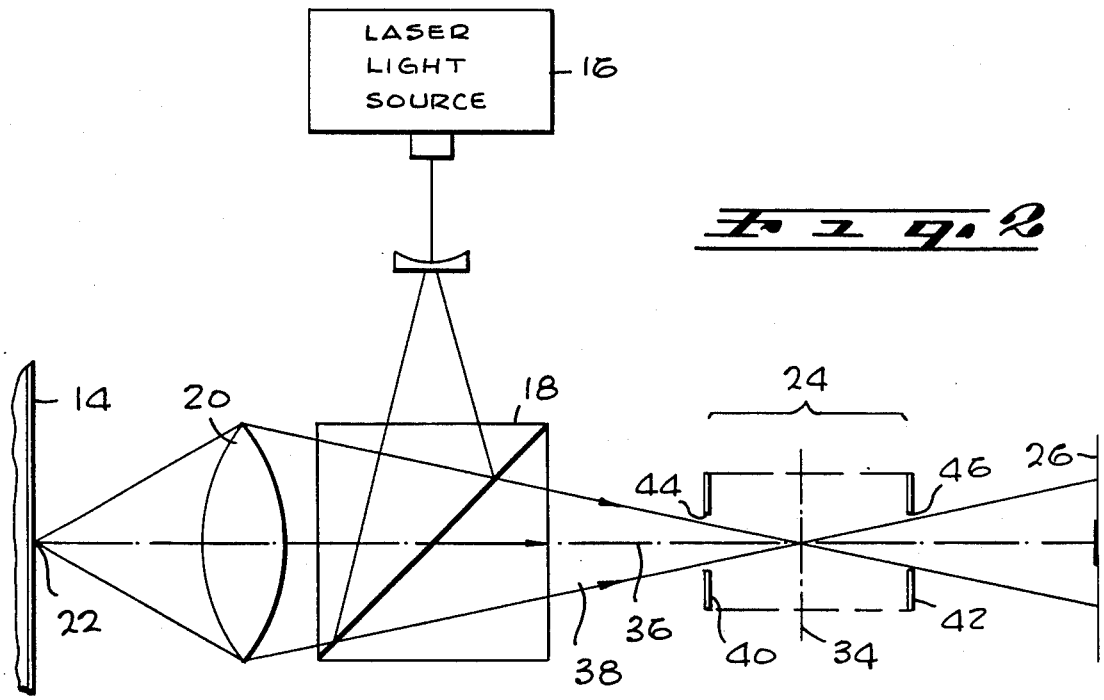
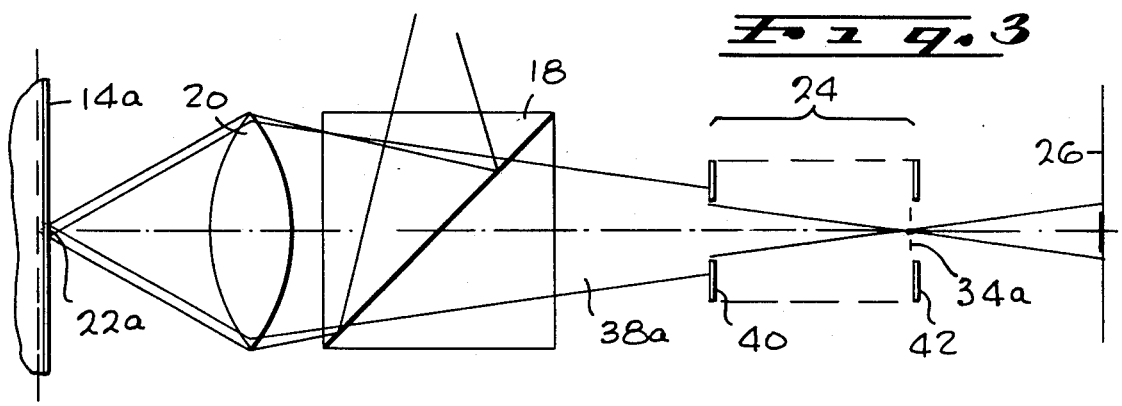
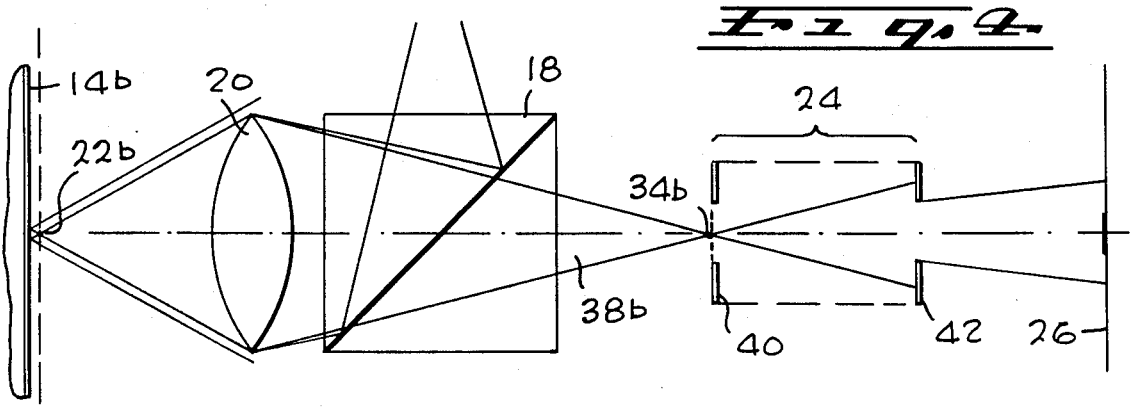

FOCUSING SYSTEM FOR VIDEODISC PLAYER

BACKGROUND OF THE INVENTION

This invention relates to a focusing device and more particularly to a system for repositioning a focusing system so as to maintain a scanning beam accurately focused on a videodisc in spite of variations in disc position.

One type of videodisc player utilizes a disc which is rotated on a turntable and which is scanned by a light beam that is accurately focused by a lens onto the videodisc surface. Light reflected from the videodisc is collected by the focusing lens and directed onto a photodetector that drives a video output. In order to read out information recorded at high densities on the disc surface, the scanning beam must be accurately focused on the videodisc surface so that the light spot covers only a very small prescribed area. However, such videodiscs are subject to warpage and surface waviness, which varies the position of the scanned area and some videodisc systems have a variable spacing between disc surface and scanning head. Such variations can be compensated for, by moving the focusing lens toward and away from the turntable, but this requires apparatus for sensing the amount and direction of shifting of the videodisc surface being scanned.

SUMMARY OF THE INVENTION

In accordance with one embodiment of the present invention, a system is provided for use in a videodisc player to sense variations in the position of the videodisc surface being scanned, to thereby provide energizing signals for a motor that shifts the focusing lens in a direction to compensate for such variations. The system essentially senses any variation in the cross sectional area of the reflected light beam which is concentrated by the focusing lens and which is directed towards the photodetector that drives a video display. Varitions in the area or width of the reflected light beam at a given position along its path, are due to shifting of the videodisc along the optical axis, and therefore variations in the beam width can be used to accurately shift the lens position so as to compensate for such variations in the disc position.

One system of the invention for measuring variations in the light beam width, includes two photocells spaced from one another along a common path of the reflected light beam. Each photocell includes a hole centered on the axis of the reflected light beam. Accordingly, each photocell detects only the peripheral portion of the light beam. The hole in the first photocell permits light near the optical axis to pass to the second photocell, so that the two photocells can be located along a common optical axis. This eliminates the need to divide the reflected light beam into separate beams for focus detection. The hole in the second photocell allows light near the optical axis to pass through for detection by another photodetector that energizes the video display. The outputs of the first and second cells are delivered to a difference circuit whose output energizes a motor that moves the focusing system towards and away from the turntable.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 is a diagrammatic and simplified representation of a portion of the system of FIG. 1, in a case where the videodisc surface being scanned is at a nominally central position;

FIG. 3 is a view similar to FIG. 1, but with the videodisc surface shifted towards the focusing lens;

FIG. 4 is a view similar to FIG. 1, but with the videodisc surface shifted towards the focusing lens;

DESCRIPTION OF THE PREFERRED EMBODIMENTS

Figure 1:
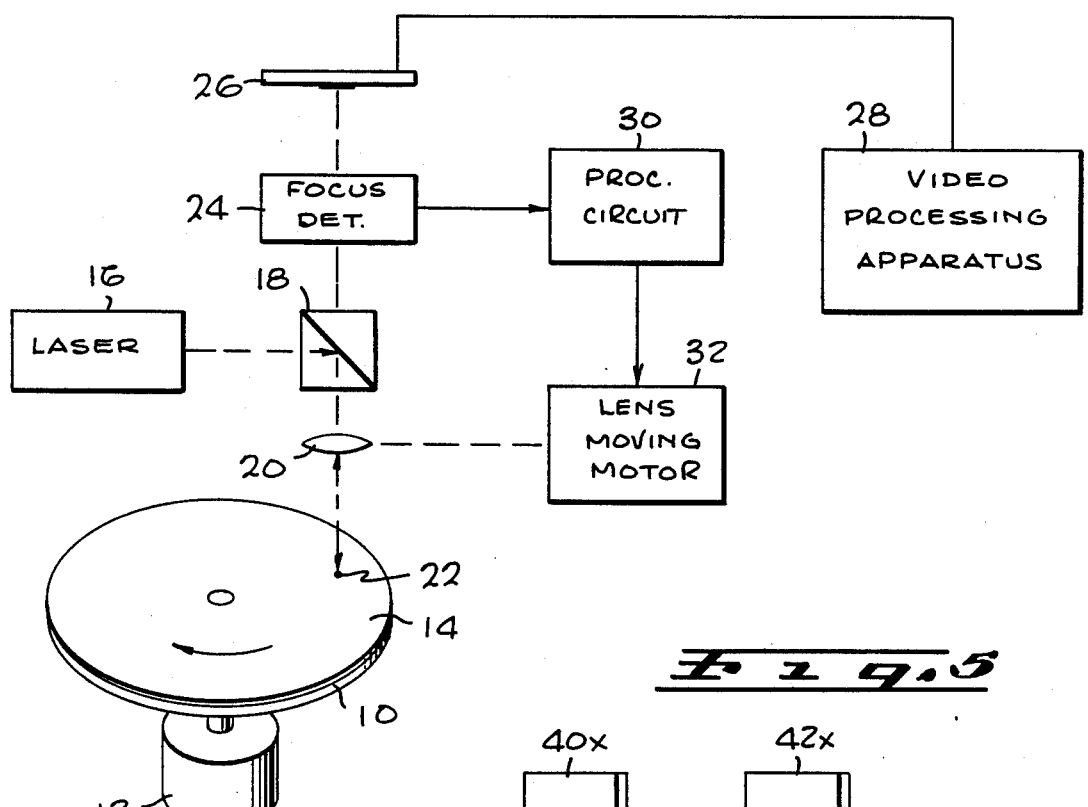
FIG. 1 is a simplified perspective and block diagram view of a videodisc player constructed in accordance with the invention.

FIG. 1 illustrates a video disc player which includes a turntable 10 rotated by a motor 12 and carrying a videodisc 14 whose surface is programmed at high density to represent information such as pictures and sound. The recorded information is read out by directing a light beam from a light source such as a laser 16 through a beamsplitter 18, through a focusing lens means 20, such as the single converging (convex-convex) lens shown; thence onto a small spot 22 at the surface of the videodisc.

The spot 22 may be referred to as a scanning spot because rotation of the videodisc results in the spot serving to scan the surface of the disc. Light reflected from the surface of the disc at the point where the spot 22 is incident, is gathered by the lens 20 which forms a converging reflected beam that passes back towards the beamsplitter 18.

The beamsplitter 18 allows the reflected light beam to pass therethrough towards a focus detector arrangement 24 and onto a video photodetector 26. Light from the photodetector 26 is delivered to a video processing apparatus 28 which may be connected to a television receiver which utilizes the incoming signal to create a television-like display. As workers in the art will recognize, the surface of videodisc 14 is configured to cause modulation in the character of the reflected radiation beam; which modulation is recognized and converted into useful information at processor 28 (after detection at detector 26). Thus, it is critically important to make sure that focusing system 20 is precisely located with respect to the surface of disc 14; for instance to assure that an informational "bit arc" (or spot) on the disc is fully and properly illuminated by the incident beam, as well as to assure the reflected beam being properly transmitted to the photodetector 26. Thus, according to a feature hereof, the focus detector unit 24 is provided to determine when, and by how much, this lens system must be relocated to maintain proper focus, this novel unit also serves to provide control signals to effect this repositioning. Thus, the purpose of the focus detector 24 is to detect shifts in the position of the videodisc 14 at the point of the scanning spot 22. The output of the focus detector 24 is delivered to a processing circuit 30 which generates a driving signal that is delivered to a positioning unit 32 that moves one or more elements of the total optical system so as to restore the desired focus. As shown in FIG. 1, the positioning unit is a motor 32 which moves lens 20 relative to disc 14 so as to re-establish the correct focus.

The lens moving motor 32 is coupled to the focusing lens 20 to shift the focusing lens towards and away from the turntable 10 so as to compensate for variations in spacing to the videodisc point being scanned. In this way, light from the source is always brought to a predetermined focus at the surface of the videodisc 14, so that the information recorded at high density thereon can be accurately read out.

FIG. 2 illustrates the manner of operation of the focus detector 24 of the invention. Light from the laser 16 or other light source is directed by th beamsplitter 18 towards videodisc 14 via focusing lens 20, the lens 20 serving to focus the light onto the small scanning spot area at 22 on the surface of the videodisc 14. Light reflected from the videodisc area at the scanning spot 22 forms a signal beam collected by the focusing lens 20, which directs it toward detector 26, the beam rays converging at an intermediate focal plane.

The beam may be polarized so that beamsplitter 18 allows almost all of the reflected beam to pass therethrough along a second direction, or optical axis 36, which is out of line with the light source 16. The reflected beam 38 passes through the focus detector 24 and reaches the photodetector 26 whose output is ultimately used to generate a video display.

In one embodiment shown in FIGS. 2, 3, and 4 to illustrate the invention, the focus detector 24 includes two photocells or photodetectors 40, 42, spaced from one another along the path of the reflected beam 38. Each photocell 40, 42 has a central hole 44, 46 respectively, centered on the axis 36 of the reflected beam 38, so that the active photodetector portion of each intercepts and detects only a peripheral portion of the reflected beam 38 while passing the central portion of the beam therethrough, without interference.

With the videodisc at its central, or nominal position, the nominal image plane 34, at which the image of the scanning spot is focused, lies inbetween intermediate photocells 40, 42. In this situation, and according to a first mode of operation, the width of the reflected beam at the planes of the two photocells 40, 42, will be understood as kept small enough so that neither cell intercepts any substantial portion of the beam.

FIG. 3 illustrates a situation when the portion of the videodisc 14 being scanned (the spot area) has shifted towards the focusing lens 20. If the lens 20 is not shifted to compensate for such movement, the scanning spot 22a will become enlarged and also the image plane 34a will be shifted rearwardly along the path of the reflected beam 38a. This shift in the position of the image plane will result in a wider beam at the first photocell 40 and a narrower beam at the second photocell 42, as illustrated.

As a result, the first photocell 40 (active area hereof) will intercept a considerable portion of the reflected beam, while the other cell 42 will detect less or none of the beam. The output from the photodetector 40, or the difference between the outputs of the photodetectors 40 and 42, is utilized as workers in the art can understand, to drive a motor to relatively separate focusing lens 20 from the videodisc at 14a so as to compensate for the shift in the videodisc position and thereby maintain the scanning spot accurately focused on the surface of the videodisc. As shown in FIG. 1, such relative separation of lens 20 and the videodisc is most conveniently accomplished by having a motor 32 move lens 20 away from videodisc 14. However, moving of the videodisc may also be utilized to accomplish such separation.

For precision applications, it may further be desirable to mechanically couple the focus-detecting apertured cells 40, 42 to lens 20 (for example by moving lens 20 and detectors 40 and 42 on a common mount) so that the motor moves all these elements together so as to maintain a constant spacing between lens and cells, and between the cells and image plane 34b (similarly with other embodiments below).

FIG. 4 illustrates the situation wherein the videodisc at 14b has shifted away from the focusing lens 20. In the absence of compensating movement by the focusing lens, the image plane at 34b will have shifted forwardly so that the width of the reflected beam 38b, and associated photo emissive area, will be smaller at the plane of the first photocell 40 but larger at the plane of the second photocell 42.

The increased signal from the second photocell 42, as compared to the first photocell 40, can be utilized to shift the focusing lens 20 (and detect unit 24) towards the videodisc at 14b, so as to bring the scanning spot 22b into sharp focus on the videodisc surface. In an actual system utilizing the two photodetectors 40, 42, to shift the focusing lens 20, there is only a small distance in shifting of the position of the image plane 34, because there are normally only small shifts of videodisc position.

Figure 6:
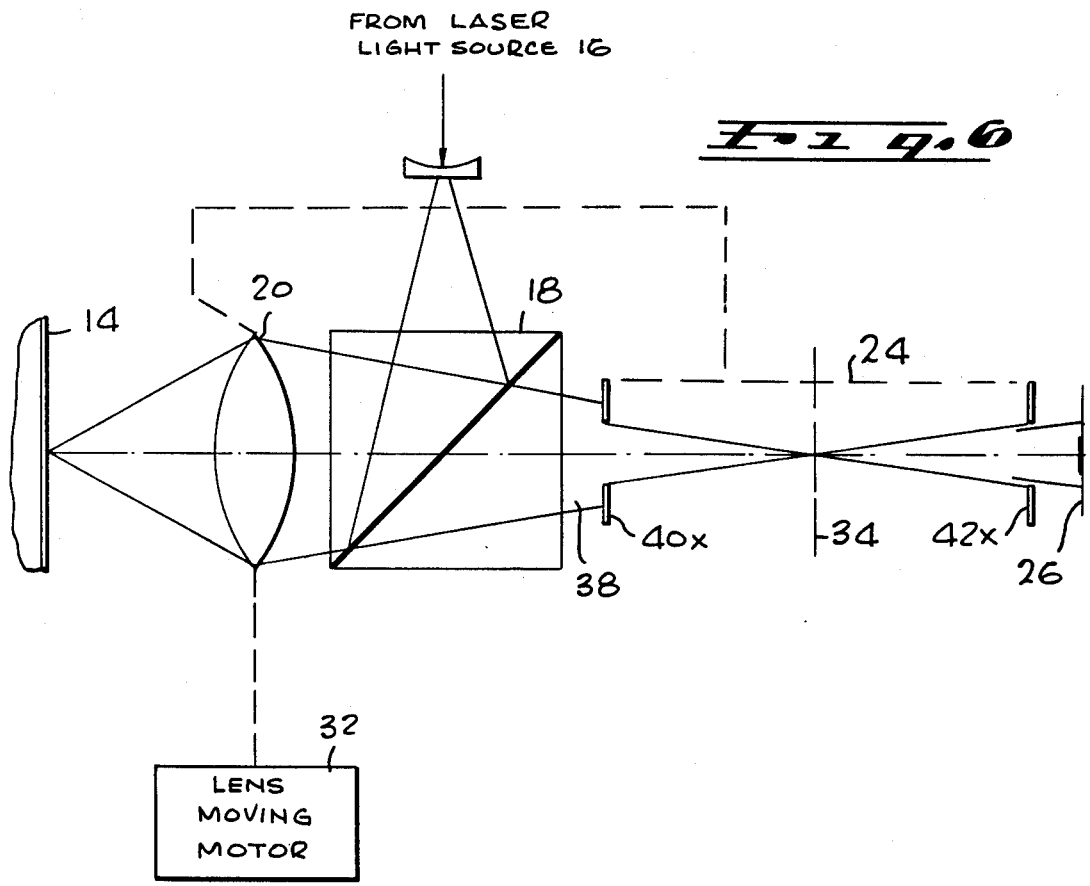
FIG. 6 is a simplified side elevation view of a focusing system constructed in accordance with the invention, this being similar to FIG. 2 but with the photocells being of a size to always intercept part of the reflected beam.

An alternative, but preferred embodiment is shown in FIG. 6. This system is designed to take account of the fact that the focusing lens 20 is shifted, typically bidirectionally, to compensate for variations in the position of the videodisc 14. The system is similar to that of FIG. 2, except that the two photocells 40x and 42x are each designed to, both, continually intercept peripheral portions of the reflected beam 38 when the videodisc 14 is in its central or nominal position, as well as during the normal range of excursions of the videodisc position.

This provides the advantage that variations in the outputs of the two photocells 40x and 42x will, here, be more linear and their differences vary more linearly, rather than the stepwise fashion indicated for the previous embodiment.

Also, when the difference between the outputs of the two photocells 40x and 42x is utilized, variations in the intensity of the reflected beam 38 tend to be cancelled out so that the main variation in the difference output is due to variations in the area of the reflected beam at the two photocell positions, assuming circular apertures. It may be noted that the sensitive area of video photodetector 26 is preferably made small enough and positioned in such location that it intercepts only the central, transmitted portion of the reflected beam; this central portion of the beam is not intercepted by either of the photocells 40x, 42x within a wide range of shifts of the videodisc. Thus the amplitude or intensity of light received by photodetector 26 is not interfered with by the operation of the focus detector of the present invention.

Figure 5:
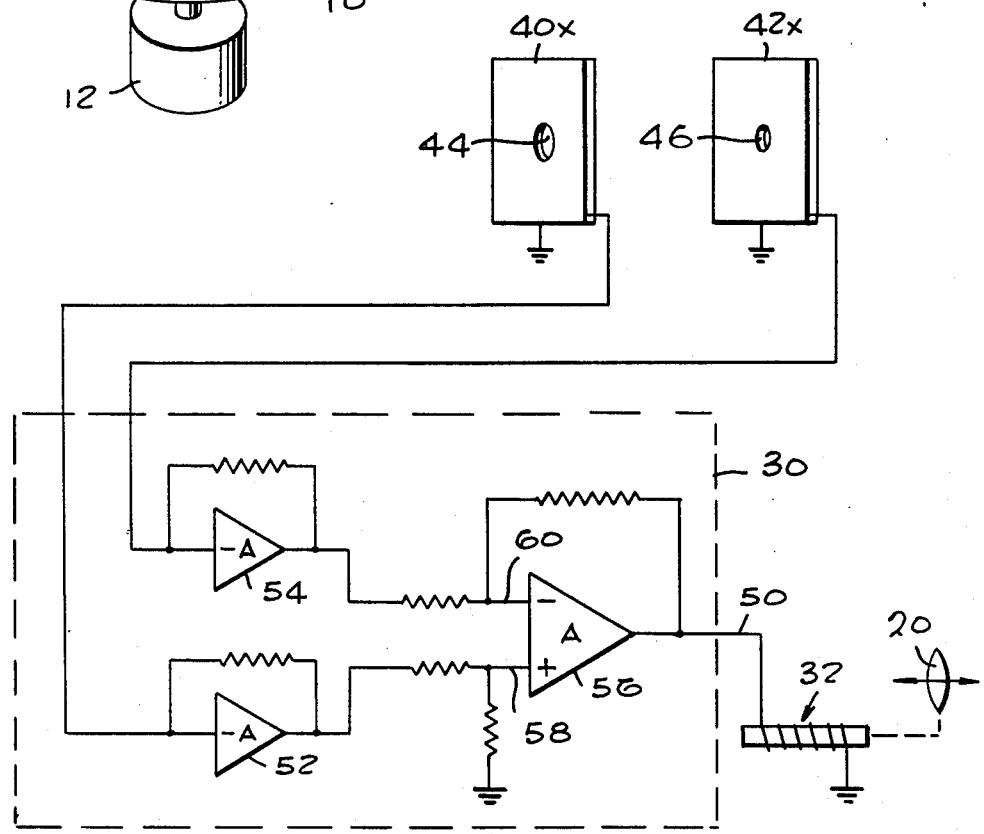
FIG. 5 is a partially perspective, partially schematic diagram of the system of FIG. 1, showing the focus-detecting photocells, comparing circuit, and driving motors.

FIG. 5 illustrates typical shapes of the photocells 40x, 42x, and the construction of the processing circuit 30. Each photocell such as 40x may be a silicon-type which is formed with an aperture 44 at its center, of a diameter at least sufficient to accommodate the contemplated beam at detector 26. It may be noted that the holes 44, 46 of the two photocells do not have to be of the same size nor need they be disposed equidistant from focal plane 34. Further, the holes need not be circular but may be of any desired shape depending upon the requirements of the optical system. Any differences in nominal photo-emissive output from the cells 40x, 42x may be accommodated by electronic compensating means as known in the art.

The processing circuit 30 is a comparing or difference circuit whose output line 50 carries a driving signal whose value depends upon the difference in the outputs of the two photocells 40x, 42x. The circuit 30 includes two amplifiers 52, 54 arranged to amplify the outputs from photocells 40x, 42x, respectively.

The outputs of amplifiers 52, 54 are delivered to a difference amplifier 56, the amplifier 52 being connected to the plus input 58 of the difference amplifier while the output of amplifier 54 is delivered to the minus input 60 of the difference amplifier. The output 50 of the difference amplifier 56 is delivered to a control means associated with the motor 32 which may thus be controlled to reposition focusing lens 20 and focus detect unit 24. The motor 32 may be a linear motor of the type that utilizes a loud speaker-type coil to move an armature that is connected to the lens 20 and detector unit 24; although a piezoelectric or other form of motive means may be utilized as workers will recognize.

Thus, the invention provides a general focusing system for moving an objective or focusing lens so as to maintain a scanning spot accurately focused on the reflecting surface of a videodisc or other target surface. The system senses variations in surface position by sensing the area of a light beam reflected by the scanned area, this beam being gathered by the focusing lens and directed to the video detect unit. The cross sectional area of this reflected light beam can be detected at two different points along the beam path by a focus detector unit, including a pair of photodetectors, properly disposed, to sense peripheral portions of the beam and which allow axial portions of the beam to pass thereby.

A processing circuit which is connected to the two photocells generates a repositioning signal dependent upon the difference in the outputs of the two photocells. This signal energizes a lens moving mechanism which shifts the focusing system axially towards or away from the turntable on which the videodisc is mounted.

Of course, a variety of particular mechanisms can be utilized in the videodisc system. For example, a convex mirror can be utilized as the objective or focusing lens means to concentrate the scanning beam on the video disc and to converge light reflected from the videodisc. Also, the photocells which detect variations in videodisc position may have transparent openings therein rather than apertures and may have a variety of shapes.

Figure 7:
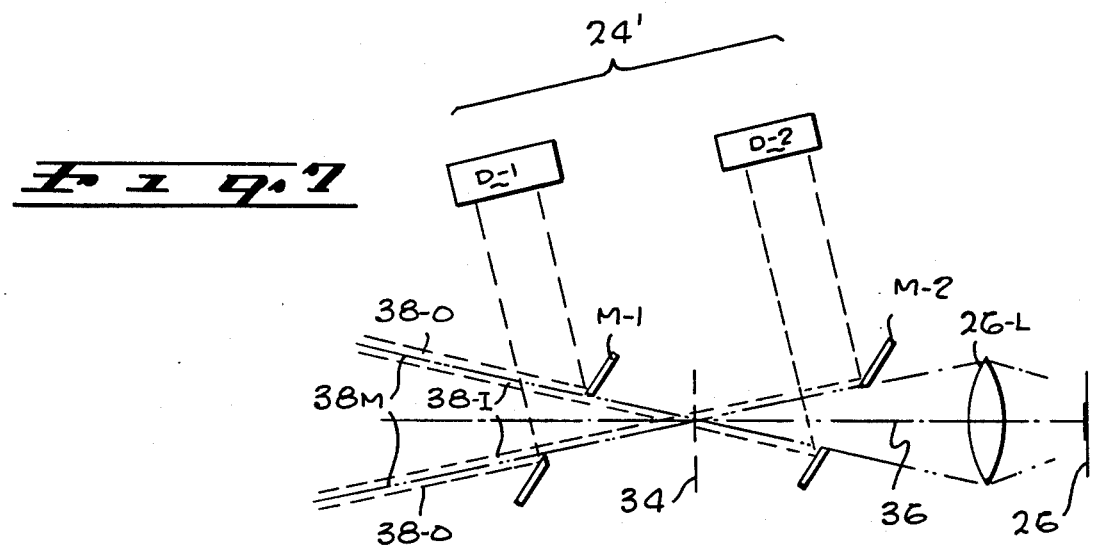
FIG. 7 is a simplified schematic elevation after the manner of FIG. 6 of an alternate focus detecting arrangement.

It is clear that a single, apertured photocell may be employed, recognizing that such a scheme might not be as accurate and/or interfere with more of the beam width. Variations in overall intensity may be compensated for by using a portion of the video output signal for comparison. Other modified forms of the photosensing arrangement of the present invention may be employed, as workers in the art will appreciate. For instance, one such modified and alternative version is indicated in FIG. 7 where, except as described, all elements and operation may be taken as similar to the foregoing embodiments, especially those with FIG. 6. Here the reflected beam 38 is directed concentric with optical axis 36 toward video detect unit 26 and may be understood, for simplicity as being generally cross-sectionally circular. Thus for explantion purposes, beam 38 includes three, somewhat-conical, converging peripheral "beam loci", namely: a medial beam locus 38-M, together with an inner beam locus 38-I and outer beam locus 38-O. Moreover, it will be understood that instead of the previously described photosensors (such as 42x, 40x) arranged along optical axis 36 and centrally apertured to pass the informational beam to detector 26 (disposed on either side of focal plane 34 associated with the lens 20, not shown here), these are substituted for by a pair of centrally-apertured mirror means M-1, M-2. These mirrors may be conventional front surface mirrors and are generally arranged in conjunction with a pair of associated respective photodetector means D-1, D-2, respectively to intercept and reflect (to their respective detectors) a prescribed outer portion of the reflected beam 38 incident thereon, for purposes similar to the foregoing. Additionally, and purely for convenience, a double-converging lens 26-L is also indicated between the focusing unit comprising mirrors M and detectors D for purposes of better refocusing the central informational video beam on video detector 26. (The overall focus and detector unit is 24').

Thus here, by way of example, only, the position and dimensions of the first or upstream mirror M-1 are arranged so that all of the reflected beam area between outer beam locus 38-O and medial beam locus 38-M are intercepted and reflected to associated photodetector D-1 whereby to produce an electronic output therefrom which represents the amount of the reflected beam so intercepted. (Much in the manner of the foregoing embodiments but dispensing with the need for providing special photosensors which are centrally relieved or made translucent). Similarly, the second, or downstream, mirror means M-2 is arranged to intercept and reflect a second concentric, inner portion of reflected beam 38, essentially comprising that portion between medial beam locus 38-M and inner beam locus 38-I. This will leave only the beam defined within the limits of inner beam locus 38-I, of course, to pass beyond the focus detection unit 24' to arrive at video detect unit 26, being intermediately focused by lens 36-L as indicated above.

Of course, the beam energy intercepted and reflected to detector D-2 associated with mirror means M-2 will similarly represent the amount of total beam cross-section intercepted to produce an output which, when combined with that from companion detector D-1, can conjunctively indicate beam-interception parameters. Such parameters can be used quite useful as with the prior embodiments, especially since these measurements will necessarily be much more comparable and relative to one another, as with the embodiment of FIG. 6 described above. Thus, for instance, the focusing lens 20 and associated mirrors M-1, M-2 may be mounted on a common positioning bar or mount so that, with a prescribed incident and reflected data beam, the detected output from detectors D-1 and D-2 is relatively "equal" when the reflector surface is at the prescribed "nominal" position. Any variance of this surface from this position, in either direction will, of course, produce a corresponding imbalance in the outputs from detectors D-1, D-2, the polarity and amount thereof indicating the degree of imbalance. This also provides a means for positioning a positional servo motor or system to adjust the position of this bar so as to reposition the lens and mirror system relative to the reference surface, as indicated before.

Of course, workers in the art will visualize adjustments and variations feasible within the present skill and state of the art. For instance, while it is apparent that lens aberrations (e.g., spherical) may be present at certain distances away from the optical axis (even where monochromatic radiation is employed) however, since the focus detect unit according to the invention makes use only of the outer peripheral portions of the reflected radiation portions which are most apt to be rife with such aberrations and other anomalies, it will be apparent that only the least desirable, most expendable portions of the video beam are being masked and used for focus positioning.

It will also be apparent that the system may be modified in certain cases to accommodate other objects not particularized here. For instance, there is apt to be a time lag wherein the servo means is repositioning the optics relative to the disc surface; accordingly workers may prefer it to "anticipate" a disc deviation prior to the time the bit surface in question is advanced under the radiation. In these cases it will be apparent that it may often be possible to provide a focus-repositioning system and associated servo of the type indicated here, viewing an earlier responding portion of the videodisc to thus effect the desired anticipation and avoid a "servo lag".

Workers in the art will also recognize that such a system for sensing variations of a reference surface from a nominal position and automatically compensating therefor may be applied in other analagous applications such as to maintain a tool or instrument at a prescribed distance above a moving reference surface, such as aligning an x-ray detection instrument at a prescribed distance above a moving production line (e.g., for "real-time" weld inspection) where the source-work separation distance is critical and must be maintained quite precisely.

Although particular embodiments of the invention have been described and illustrated herein, it is recognized that modifications and equivalents may readily occur to those skilled in the art and consequently, it is intended that the claims be interpreted to cover such modifications and equivalents.

What is claimed is:

1. Apparatus for determining deviation of an information bearing, reference surface from a prescribed reference position with respect to a prescribed remote reference point, this apparatus comprising in combination:
    a source of radiation adapted to direct prescribed radiation at the subject reference surface so as to be affected by the information and reflected from the surface toward said reference point;
    radiation focusing means arranged and adapted to be interposed along the radiation path between said surface and said point so as to focus said radiation into a beam convergingly to provide a prescribed reference focal plane therebetween with converging and diverging beam portions respectively on either side of this focal plane;
    radiation beam interrupting means including sensing means arranged along this reflecting path having first and second elements on respectively opposite sides of said focal plane and adapted to pass substantially all of said reflected radiation, intercepting only prescribed respective peripheral portions of the converging or diverging beam and adapted to emit respective signals corresponding to the amount of cross-sectinal beam area so intercepted; and
    signal conversion means arranged to receive said signals and adapted to translate them into "error signals" representative of said reference surface deviation.

2. The combination as recited in claim 1 wherein said sensing means comprises a pair of photosensors each including an array of photosensitive material and arranged and disposed to transmit a prescribed central portion of said reflected beam to be used independently elsewhere.

3. The combination as recited in claim 1 wherein said beam interrupting means first and second elements respectively includes reflector means disposed in said reflected beam path and arranged to transmit the central portion of the converging or diverging beam to be used elsewhere separately and to intercept and reflect only limited prescribed respective peripheral portions of the converging or diverging beam, and further includes associated photodetector means disposed to receive the peripheral beam portions reflected by said reflector means and adapted to generate a signal representing the amount of beam radiation so reflected.

4. Apparatus for determining the position deviation of a point on an information bearing surface comprising:
    a radiation source adapted and arranged to project an original light beam to be reflected and affected by said point on said surface so that upon reflection and transmission along a prescribed reflected beam path, it may be received and utilized by a prescribed beam detector means;
    lens means interposed along said prescribed reflected beam path above said point and adapted to focus the original radiation beam onto the point, as well as to collect light reflected from the point on the surface to form a reflected converging focusing light beam;
    focus detector means arranged along said reflected beam path between said lens means and the beam detector means, said focus detector means including first and second photodetectors spaced from each other along the path of said reflected light beam, each photodetector having regions defining a hole centered on the axis of said reflected beam path so as to transmit the major portion of said reflected beam to said beam detector means substantially unaffected while otherwise intercepting the peripheral balance of said reflected beam, whereby the proportion of the reflected beam intercepted by each photodetector depends on the width of the beam at the plane of the respective photodetector, said photodetectors being responsive to the radiation intercepted by each of them to emit an electronic signal representing the cross-sectional area of said reflected beam so intercepted.

5. The combination as recited in claim 4 wherein said radiation source comprises a light source and wherein is also included beamsplitter means, positioned between said light source and said lens means, adapted to direct said original light beam from said source through said lens means and also adapted to direct said reflected light beam toward said beam detector means.

6. The apparatus described in claim 4 including:
lens moving means coupled to said lens means and responsive to said signal from said focus detector means for moving said lens means towards and away from the surface to maintain said original radiation beam in sharp focus thereon.

7. The apparatus described in claim 4 including:
a third photodetector spaced along the path of said reflected light beam behind said first and second photodetectors, to detect the major portion of said reflected light beam that passes through said first and second photodetectors, for continuously detecting reflected light beam intensity without requiring splitting of the reflected light beam.

8. In a videodisc player in which a light beam from a light source is directed through a focusing lens onto a videodisc, the improvement of a system for maintaining the light beam accurately focused on the videodisc surface in spite of variations in the position of the videodisc surface comprising:
beam splitter means positioned along the optical path between the light source and the lens, for passing light from the source to the lens in a first direction towards the videodisc while allowing the light reflected from the videodisc and passing back through the lens to emerge from the beam splitter means in a second direction, out of line with the light source;
first and second photodetectors positioned along the optical path of light emerging along said second direction from the beam splitter means, said first and second photodetectors located at planes spaced from each other along said second direction, each photodetector having an aperture including the optical axis to transmit the major portion of the light returning from the videodisc to a detector for recovering stored information therefrom, and so that the amount of light incident on the sensitive area of each photodetector depends upon the width of the light beam at the plane of that photodetector, whereby the relative outputs of the two photodetectors varies with shifting of the position of the videodisc along the optical path;
lens moving means coupled to the lens to move it towards and away from the videodisc; and
means for energizing said lens moving means, including a comparing circuit coupled to said first and second photodetectors for generating an energizing signal, and means for applying said energizing signal to said lens moving means.

9. The improvement described in claim 8 wherein:
each photodetector includes a layer of photosensitive material with a hole, said hole being positioned on the optical axis so that a substantial portion of the light beam passes through the photodetector; and
said photodetectors are located at positions along the optical axis which are chosen so that at some positions of the lens and videodisc the image of the videodisc lies in a plane between said first and second photodetectors.

10. The improvement described in claim 9 wherein:
said holes in said first and second photodetectors are of a size chosen so that when the videodisc image lies halfway between said photocells, a portion of the photosensitive area of each photocell lying about the hole thereof, is illuminated by the beam, whereby to enhance the linearity of response of the system.

11. A videodisc player comprising:
turntable means for rotating a videodisc;
lens means spaced from the position of a videodisc on said turntable means, for focusing an original light beam onto the videodisc and for collecting light reflected from the videodisc to form a reflected light beam;
a light source for generating an original light beam;
a focus detector assembly;
beamsplitter means positioned between said light source and said lens means for directing said original light beam from the source towards the lens means, and for directing said reflected light beam, which passes back through the lens, towards the detector assembly;
said focus detector assembly including first and second photodetectors each having photosensitive material spaced from the axis of the reflected light beam and transparent to the passage of light near said axis, for transmitting the major portion of said reflected beam without interference and for generating a driving signal dependent upon the area of the reflected light beam at the location of each of photodetectors;
lens moving means responsive to said driving signal for moving said lens means towards and away from the position of a videodisc on said turntable; and
video output means including a photodetector responsive to the major portion of said reflected light beam for generating a video display.

12. A videodisc and player assembly comprising:
a turntable with a videodisc thereon;
lens means spaced from the videodisc for focusing a source light beam onto the videodisc and for collecting light reflected from the videodisc to form a converging reflected light beam;
a light source for generating a source light beam;
a beamsplitter for directing said source light beam from said light source towards said lens means while directing the reflected light beam received from said lens means into a second path which is optically out of line with said light source;
a pair of photosensitive cells spaced from one another along said second path of the reflected light beam, each cell having a central aperture at the axis of said second path for passing the major portion of said reflected light beam and having photosensitive material around the aperture responsive to a limited portion of said reflected light beam from the outer periphery thereof;
a video display assembly including a photodetector behind said pair of photosensitive cells to receive the major portion of said reflected light beam and means responsive to said photodetector for generating a video display;
difference circuit means coupled to said pair of photosensitive cells for generating a driving signal of a value dependent upon the difference in the outputs of said cells; and
motor means responsive to the driving signal of said difference circuit means and coupled to said lens means to move said lens means towards and away from said turntable.

13. A method for repositioning a surface subject to deviation from a nominal position wherein at least a portion of the surface is adapted to exhibit a prescribed radiant reflectivity, this method comprising:
   directing a beam of prescribed radiation to be reflected by said surface along a prescribed reflection path;
   selecting focusing means and disposing the focusing means along said reflection path so as to focus the beam at a prescribed focal plane therealong;
   providing beam cross section interrupting means including radiation-sensitive beam detection elements on either side of this focal plane adapted to intercept a prescribed portion of the beam cross-section, respectively, from the peripheral portion thereof and to pass, uninterrupted the major portion of the beam including the central component thereof, and emit a signal representative of that portion intercepted; and
   providing signal handling means adapted to receive said signals and responsively indicate the degree and direction of surface variation.

14. Apparatus for determining deviation of a reference surface from a prescribed reference position with respect to a prescribed remote reference point, this apparatus comprising in combination:
   a source of radiation adapted to direct prescribed radiation at the subject reference surface so as to be reflected therefrom toard said reference point;
   radiation focusing means arranged and adapted to be interposed along the radiation path between said surface and said point so as to focus said radiation into a beam convergingly to provide a prescribed reference focal plane therebetween with converging and diverging beam portions respectively on either side of the focal plane;
   a pair of radiation beam interrupting means disposed respectively in said converging and diverging beam portion and arranged to transmit the major fraction of the reflected radiation as contained in a prescribed central portion of said converging and diverging beam portions to be used elsewhere separately and to reflect a minor fraction of the reflected radiation as contained in peripheral portions of said converging and diverging beam portions; and
   photodetector means associated with said interrupting means and disposed to receive said reflected peripheral portions and adapted to generate a signal representing the amount of radiation so reflected; and
   signal conversion means arranged to receive said signals generated by said photodetector means and adapted to translate them into error signals representative of said reference surface deviations.

15. In a videodisc player in which a light beam from a light source is directed through optical means to form a focused spot on a videodisc and in which the light beam from the videodisc is detected by a video-photodetector to provide a signal for use by a video display means to produce a video display, the improvement of a system for maintaining the light beam accurately focused on the videodisc in spite of variations in the position of the videodisc, comprising:
   beam interrupting means including first and second detector elements spaced from one another along the path of the light beam after it emerges from the videodisc, for generating first and second signals dependent upon the width of the light beam at the respective positions of the detector elements, said first detector element being closer to the videodisc than said second detector element, said first and second detector elements each having a unitary photosensitive surface bounded between an inner closed figure which encircles the axis of the beam path and an outer closed figure which surrounds the inner closed figure, each detector element being devoid of photosensitive material and being transparent to the passage of the major portion of emerging radiation including the axis of the beam path;
   moving means coupled to the optical means and energizable to move the optical means towards and away from the videodisc; and
   means responsive to the signals generated by said first and second detector elements, for energizing said moving means.

* * * * *

UNITED STATES PATENT OFFICE
CERTIFICATE OF CORRECTION

Patent No. 3,997,715          Dated Dec. 14, 1976

Inventor(s) JAMES E. ELLIOTT

It is certified that error appears in the above-identified patent and that said Letters Patent are hereby corrected as shown below:

COLUMN 2, lines 10, 12 and 15, change "1" to --2--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*